(12) United States Patent
Chapet

(10) Patent No.: US 7,866,563 B2
(45) Date of Patent: Jan. 11, 2011

(54) TOKEN WITH ELECTRONIC DEVICE, METHOD OF MAKING THEREOF, AND APPARATUS FOR MAKING THEREOF

(75) Inventor: Pierre Chapet, Beaune (FR)

(73) Assignee: Gaming Partners International, Savigny les Beaune (FR)

( * ) Notice: Subject to any disclaimer, the term of this patent is extended or adjusted under 35 U.S.C. 154(b) by 571 days.

(21) Appl. No.: 11/791,975

(22) PCT Filed: May 25, 2007

(86) PCT No.: PCT/IB2007/001371

§ 371 (c)(1),
(2), (4) Date: Jul. 27, 2007

(87) PCT Pub. No.: WO2008/146067

PCT Pub. Date: Dec. 4, 2008

(65) Prior Publication Data

US 2009/0146373 A1    Jun. 11, 2009

(51) Int. Cl.
G06K 19/06    (2006.01)
A63B 71/00    (2006.01)
A63F 9/00    (2006.01)

(52) U.S. Cl. .................... 235/492; 235/451; 273/148 R
(58) Field of Classification Search ................. 235/375, 235/380, 451, 487, 488, 492
See application file for complete search history.

(56) References Cited

U.S. PATENT DOCUMENTS

| | | | |
|---|---|---|---|
| 1,624,335 A | 4/1927 | Green | |
| 1,935,308 A | 11/1933 | Baltzley | |
| 2,410,845 A | 11/1946 | Snell et al. | |
| 2,450,997 A | 10/1948 | Shann | |
| 2,544,118 A | 3/1951 | Went | |
| 2,836,911 A | 6/1958 | Priesneyer | |
| 2,983,354 A | 5/1961 | Ember et al. | |
| 3,034,643 A | 5/1962 | Keller et al. | |
| 3,295,651 A | 1/1967 | Klackowski et al. | |

(Continued)

FOREIGN PATENT DOCUMENTS

AU    68546/90 B    7/1991

(Continued)

OTHER PUBLICATIONS

International Search Report of International Application No. PCT/IB2007/001371.

(Continued)

*Primary Examiner*—Thien M. Le
*Assistant Examiner*—Tuyen K Vo
(74) *Attorney, Agent, or Firm*—Brownstein Hyatt Farber Schreck, LLP

(57) ABSTRACT

Token including a token body obtained by at least one injection of material around an insert including a contactless identification device attached to a rigid plate sandwiched between two layers of injected material, the rigid plate including at least one through-hole. The invention also concerns the method of manufacturing such a token, including placing the insert in a mold, injecting a plastic material around the insert to form at least a portion of the core of the token, and at least one injection of plastic material around the assembly formed by the insert and the portion of the core obtained after the first injection of plastic material.

19 Claims, 5 Drawing Sheets

U.S. PATENT DOCUMENTS

| | | |
|---|---|---|
| 3,306,462 A | 2/1967 | Cruz |
| 3,439,439 A | 4/1969 | Stimson |
| 3,670,524 A | 6/1972 | Korwin |
| 3,766,452 A | 10/1973 | Burpee et al. |
| 3,862,400 A | 1/1975 | Thompson |
| 3,882,482 A | 5/1975 | Green |
| 3,926,291 A | 12/1975 | Burke et al. |
| 3,936,878 A | 2/1976 | Chrysler |
| 3,953,932 A | 5/1976 | Graves |
| 4,026,309 A | 5/1977 | Howard |
| 4,183,432 A | 1/1980 | Lemaire |
| 4,277,774 A | 7/1981 | Fujii et al. |
| 4,283,709 A | 8/1981 | Lucero et al. |
| 4,371,071 A | 2/1983 | Abedor et al. |
| 4,373,135 A | 2/1983 | Mohan et al. |
| 4,395,043 A | 7/1983 | Garcione |
| 4,399,910 A | 8/1983 | Gutentag |
| 4,435,911 A | 3/1984 | Jones |
| 4,511,796 A | 4/1985 | Aigo |
| 4,570,058 A | 2/1986 | Havassy |
| 4,637,613 A | 1/1987 | Bishop |
| 4,638,171 A | 1/1987 | Gassman |
| 4,674,618 A | 6/1987 | Eglise et al. |
| 4,675,973 A | 6/1987 | Siu |
| 4,703,165 A | 10/1987 | Colodner et al. |
| 4,725,924 A | 2/1988 | Juan |
| 4,755,941 A | 7/1988 | Bacchi |
| 4,814,589 A | 3/1989 | Storch et al. |
| 4,818,855 A | 4/1989 | Mongeon et al. |
| 4,827,640 A | 5/1989 | Jones |
| 4,838,404 A | 6/1989 | Smith et al. |
| 4,926,996 A | 5/1990 | Eglise et al. |
| 4,969,549 A | 11/1990 | Eglise |
| 4,973,524 A | 11/1990 | Huebner et al. |
| 4,999,742 A | 3/1991 | Stampfli |
| 5,007,641 A | 4/1991 | Seidman |
| 5,038,022 A | 8/1991 | Lucero |
| 5,094,922 A | 3/1992 | Ielpo et al. |
| 5,103,081 A | 4/1992 | Fisher et al. |
| 5,159,549 A | 10/1992 | Hallman, Jr. et al. |
| 5,166,502 A * | 11/1992 | Rendleman et al. ......... 235/492 |
| 5,179,517 A | 1/1993 | Sarbin et al. |
| 5,216,234 A | 6/1993 | Bell |
| 5,265,874 A | 11/1993 | Dickinson et al. |
| 5,283,422 A | 2/1994 | Storch et al. |
| 5,361,885 A | 11/1994 | Modler |
| 5,367,148 A | 11/1994 | Storch et al. |
| 5,399,847 A | 3/1995 | Droz |
| 5,406,264 A | 4/1995 | Plonsky et al. |
| 5,451,756 A | 9/1995 | Holzer et al. |
| 5,487,459 A | 1/1996 | Farmont |
| 5,498,859 A | 3/1996 | Farmont |
| 5,561,548 A | 10/1996 | Engle |
| 5,568,666 A | 10/1996 | Seibert |
| 5,575,374 A | 11/1996 | Orus et al. |
| 5,651,548 A | 7/1997 | French et al. |
| 5,673,502 A | 10/1997 | Caterbone |
| 5,673,503 A | 10/1997 | Rendleman |
| 5,692,748 A | 12/1997 | Frisco et al. |
| 5,735,742 A | 4/1998 | French |
| 5,770,533 A | 6/1998 | Franchi |
| 5,794,532 A | 8/1998 | Gassies et al. |
| 5,895,321 A | 4/1999 | Gassies et al. |
| 5,941,769 A | 8/1999 | Order |
| 5,973,599 A | 10/1999 | Nicholson et al. |
| 6,021,949 A * | 2/2000 | Boiron ....................... 235/492 |
| 6,176,185 B1 | 1/2001 | Charlier et al. |
| 6,199,862 B1 | 3/2001 | Long et al. |
| 6,210,267 B1 | 4/2001 | Long et al. |
| 6,264,109 B1 | 7/2001 | Chapet et al. |
| 6,267,671 B1 | 7/2001 | Hogan |
| 6,296,190 B1 | 10/2001 | Rendleman |
| 6,402,142 B1 | 6/2002 | Warren |
| 6,467,413 B1 | 10/2002 | Charlier et al. |
| 6,508,466 B1 | 1/2003 | Rendleman |
| 6,581,747 B1 * | 6/2003 | Charlier et al. ............. 194/214 |
| 6,659,875 B2 | 12/2003 | Purton |
| 6,834,855 B2 | 12/2004 | Mancuso |
| 6,845,905 B2 | 1/2005 | Blad et al. |
| 7,063,012 B2 | 6/2006 | Tollhupp |
| 7,100,501 B2 | 9/2006 | Tollhupp |
| 2003/0218299 A1 | 11/2003 | Zapata |
| 2004/0087375 A1 | 5/2004 | Gelinotte |
| 2004/0229682 A1 | 11/2004 | Gelinotte |
| 2006/0273181 A1 | 12/2006 | Charlier et al. |
| 2007/0105616 A1 | 5/2007 | Chapet et al. |

FOREIGN PATENT DOCUMENTS

| | | |
|---|---|---|
| CA | 2 306 226 A1 | 4/1999 |
| CA | 2 249 876 A1 | 10/1999 |
| DE | 8 909 783 | 10/1990 |
| DE | 9 300 173 | 4/1993 |
| DE | 4 400 744 | 8/1994 |
| DE | 4 311 561 | 10/1994 |
| DE | 4 439 502 | 9/1995 |
| DE | 4 440 744 | 5/1996 |
| EP | 0 063 103 A1 | 10/1982 |
| EP | 0 147 099 | 7/1985 |
| EP | 0 232 174 | 8/1987 |
| EP | 0 266 497 | 5/1988 |
| EP | 0 360 613 | 3/1990 |
| EP | 0 376 062 | 7/1990 |
| EP | 0 424 355 | 4/1991 |
| EP | 0 436 497 | 7/1991 |
| EP | 0 436 502 | 7/1991 |
| EP | 0 444 373 | 9/1991 |
| EP | 0 555 683 | 8/1993 |
| EP | 0 564 051 | 10/1993 |
| EP | 0 570 874 | 11/1993 |
| EP | 0 613 103 | 8/1994 |
| EP | 0 650 148 | 4/1995 |
| EP | 0 694 872 | 1/1996 |
| EP | 0 740 818 | 11/1996 |
| EP | 0 769 770 | 4/1997 |
| EP | 0 790 848 | 8/1997 |
| EP | 0 874 336 | 10/1998 |
| FR | 1 001 412 | 2/1952 |
| FR | 2 554 293 | 5/1985 |
| FR | 2 644 268 | 9/1990 |
| FR | 2 656 538 | 7/1991 |
| FR | 2 663 145 | 12/1991 |
| FR | 2 727 032 | 5/1996 |
| FR | 2 727 548 | 5/1996 |
| FR | 2 739 708 | 4/1997 |
| FR | 2 745 103 | 8/1997 |
| FR | 2 749 093 | 11/1997 |
| FR | 2 817 373 | 5/2002 |
| FR | 2 833 102 | 6/2003 |
| GB | 1 599 120 | 9/1981 |
| GB | 2 075 732 | 11/1981 |
| GB | 2 077 556 | 12/1981 |
| GB | 2 149 623 | 6/1985 |
| GB | 2 153 128 | 8/1985 |
| GB | 2 180 086 | 3/1987 |
| GB | 2 191 368 | 12/1987 |
| GB | 2 229 845 | 10/1990 |
| WO | 87/04551 | 7/1987 |
| WO | 88/01082 | 2/1988 |
| WO | 91/06068 | 5/1991 |
| WO | 92/21105 | 11/1992 |
| WO | 94/16407 | 7/1994 |
| WO | 94/18700 | 8/1994 |
| WO | 95/08164 | 3/1995 |

| | | |
|---|---|---|
| WO | 96/07153 | 3/1996 |
| WO | 96/14115 | 5/1996 |
| WO | 96/17329 | 6/1996 |
| WO | 96/36253 | 11/1996 |
| WO | 97/27526 | 7/1997 |
| WO | 97/30414 | 8/1997 |
| WO | 99/19851 | 4/1999 |
| WO | 99/25439 | 5/1999 |
| WO | 01/08080 | 2/2001 |
| WO | 02/47023 | 6/2002 |
| WO | 03/045661 A1 | 6/2003 |
| WO | 03/049048 | 6/2003 |
| WO | 2004/102731 | 11/2004 |
| WO | 2005/069209 | 7/2005 |
| WO | 2006/106192 | 10/2006 |
| WO | WO-2007/006893 | 1/2007 |
| ZA | 9 010 453 | 10/1991 |

OTHER PUBLICATIONS

Written Opinion of International Application No. PCT/IB2007/001371.

* cited by examiner

US 7,866,563 B2

TOKEN WITH ELECTRONIC DEVICE, METHOD OF MAKING THEREOF, AND APPARATUS FOR MAKING THEREOF

BACKGROUND OF THE INVENTION

1. Field of the Invention

The present invention concerns tokens including contactless electronic microchip identification devices, in particular gaming or casino chips.

2. Discussion of Background Information

Gaming chips are generally fabricated from rigid plastic material resistant to scratching to obtain a robust overall structure. Gaming chips feature varied patterns of designs or colors to form a more or less complex decoration and to reduce the risks of counterfeiting and/or fraudulent reproduction. Moreover the use of color codes and colored patterns associated with the value of the chips, especially on the edge of the chips, enables croupiers or other users to identify and/or sort chips quickly, at a glance, even when stacked up.

To combat fraud and to facilitate counting and tracking of chips, especially in a gaming room or a casino, chips have been proposed incorporating inserts including an electronic circuit with memory in which information associated with the chip is stored, for example its identification number or code and/or its face value. Communication between the electronic circuit module integrated into the chip and its external read/write station is usually effected without contact; a contactless electronic microchip identification device is then used including an electronic microchip or circuit associated with an antenna, generally a circular loop antenna, to enable "contactless" communication with the read/write station using the radio-frequency identification technique.

Originally the electronic microchip (or circuit) was simply connected to the antenna by a basic electrical connection, allowing any movement of the chip in space relative to the antenna or vice-versa. This made the electrical connection very fragile. Thus attempts have been made to immobilize the microchip and the antenna in a casing or to embed the microchip and the antenna in a mass of material to preserve the connection between the microchip and the antenna.

U.S. Pat. No. 4,969,549 (Eglise) describes a payment token usable in public telephone installations in which the electronic circuit and its antenna are encapsulated in a plastic material disk of small diameter, from 20 to 30 mm, the token having a conductive axial core passing through its center.

U.S. Pat. No. 5,166,502 (Rendelman) describes a casino chip in which the antenna and the electronic circuit are disposed inside a metal ballast itself placed between two face plates at the center of an injected plastic material ring, the whole being held in place by epoxy resin and by a second injection covering the ring and the periphery of the plates. This chip is of complex structure and costly to manufacture, however. Moreover, it does not offer all the necessary security in that it is possible to access the electronic circuit by merely cutting one face plate without completely destroying the structure of the chip and rendering it unusable.

The applicant has itself proposed a solution described in U.S. Pat. No. 6,021,949, in which the casino chip includes a central disk consisting of a rigid plastic material shell charged with metallic particles and carrying an electronic identification device and an annular ring of plastic material injected around the disk, said plastic material possibly being charged with mineral particles. In a first variant, the one-piece shell is injected around a protective casing into which the electronic device has previously been integrated. In a second variant the shell is obtained by placing and fastening together the electronic identification device, a cover and a hollow injected plastic material disk. Although giving good results, this technique of manufacturing chips with electronic identification has limitations, especially in terms of the total thickness of a casino chip. Using this technique, it is difficult to reduce the thickness below 3.3 mm (for a diameter that is generally from 39 to 50 mm) and even virtually impossible to achieve the standard chip thickness, which is of the order of 3 mm.

The applicant's U.S. Pat. Nos. 5,895,321 and 6,264,109 disclose chips in the form of disks the body whereof consists of two injected plastic material half-disks with axial projections, defining at the center of the chip a housing for the electronic identifier, the two half-disks being fastened together by the edgewise injection of a plastic material seal.

The electronic identifier of this kind of chip is provided in particular by an electronic circuit connected to an antenna, the circuit and the antenna being attached to a flexible film to protect the electrical connections between the circuit and the antenna.

This kind of electronic identifier is still fragile, however, because of the flexibility of the film carrying the various electronic components. Also, these electronic identifiers were subsequently replaced by rigid plates featuring an electronic microchip connected to an antenna attached to the plate, preferably by printed circuit manufacturing methods, the plate being made from epoxy resin.

The applicant's international application WO 2007/06893 describes a chip having this kind of rigid plate enclosed in a chip body obtained by at least one injection of material around said plate.

Although the chip described in the above application can be made at relatively low cost, it is somewhat fragile, especially where the plate and the core of the chip are fastened together by the first injection of plastic material around the plate.

SUMMARY OF THE INVENTION

An object of the present invention is to propose tokens with contactless electronic identification devices, in particular casino chips, that are relatively inexpensive to manufacture but are nevertheless very robust and offer improved protection against counterfeiting.

The above object is achieved by means of a token according to the invention including an insert comprising a contactless identification device attached to a first face of a rigid plate and two protection layers obtained by injection of material, said layers covering at least partially said face of said plate and a second face of said plate. According to the invention, the plate includes at least one through-hole enabling said layers to be fastened together through said plate by the formation of at least one bridge of material passing through said hole and obtained by said injection of material.

Thus the contactless identification device is trapped by the injected plastic material. It is impossible to extract the identification device from the insert obtained by the first injection of plastic material without destroying the rigid plate, and so it is impossible to remove the identification device from inside the token without completely destroying the token.

In a first embodiment, at least two through-holes are formed in the plate, distributed about the center of the plate. The plate is therefore better attached to the two layers because a plurality of bridges pass through the plate. The adhesion between the two layers is strengthened by a symmetrical distribution of the bridges.

In another embodiment, the holes have different diameters. In this way, the diameter of the hole can vary depending on whether the hole must be made near or far from an electronic component. The farther the hole from a component, the greater its diameter as the probability of damaging an electronic component when drilling the hole is low. It will also be noted that the larger the diameter of the hole, the better the layers are fastened together through the rigid plate.

The token according to the invention preferably has one or more of the following features, separately or in combination:
- the contactless identification device includes an electronic microchip fastened to the plate;
- said electronic microchip is covered with a protective resin, preferably a protective varnish contributing to the temperature resistance of the microchip;
- said contactless identification device includes an antenna produced on the rigid plate like a printed circuit;
- the antenna is produced in the form of a winding at the periphery of the rigid plate;
- the token includes a ballast produced by a first injection of material more dense than that from which the remainder of the token is produced (i.e. the portions of the token that are neither the layers nor the insert), the dense material being distributed on both sides of the insert and extending in particular through the through-hole;
- said dense material is a plastic material charged with tungsten powder;
- said body is produced by at least one injection of plastic material around the assembly formed by the ballast and the insert;
- said token body includes:
  - a token body core obtained by injection of plastic material and having a central portion defining the central portion of the token body and a peripheral portion defining at least in part the edge of said token body, and
  - a covering layer obtained by a second injection of plastic material around the peripheral portion of the core to produce with the core all or almost all of the edge and the peripheral portion of the token body; and
- the core defines at least in part the peripheral portion of the token body.

The invention also relates to a method of manufacturing a token including an insert obtained by at least one injection of material around a rigid plate a first face whereof features a contactless identification device. According to the invention, the rigid plate includes at least one through-hole and the method includes the following steps:
a) placing the rigid plate in a mold;
b) first injection of a material onto said first face of said plate and onto a second face of said plate to form, on each of said faces on both sides of said plate, a layer of material, said layers being fastened together by at least one bridge formed by the injected material passing through said at least one hole, the resulting assembly constituting an insert; and
c) at least one supplementary injection of plastic material around said insert.

Moreover, the injection of material on both sides of the rigid plate produces a ballast by injection of a dense material that extends on both sides of the plate. The token obtained in this way has the benefit of a homogeneous distribution of its mass relative to the median plane of its thickness.

Furthermore, it is possible to produce ballasts whose dimensions are less than the dimensions of the rigid plate. Thus to obtain a token of predetermined required weight, it is possible to use different dense materials (with different densities) and/or to choose the dimensions of the ballast. The additional degree of freedom represented by the possibility of varying the dimensions of the ballast gives greater freedom in the manufacture of the tokens.

Moreover, if the ballast has dimensions less than those of the rigid plate of the insert, then a portion of the plate projects after injection of the dense material. This projecting portion of the plate is advantageously used as the core of the second injection of plastic material so that the plastic material is attached to the insert formed by the plate and the ballast. This projecting portion of the plate also has the advantage of being embedded in the plastic material of the second injection so that, when the token is finished, extracting the identification device from the token is impossible without completely destroying the token.

BRIEF DESCRIPTION OF THE DRAWINGS

Other advantages of the present invention will become apparent on reading the following description, referring to two embodiments of a token according to the invention by way of non-limiting example, which description is given with reference to the appended drawings, in which.

DETAILED DESCRIPTION OF THE PRESENT INVENTION

Figure 1:
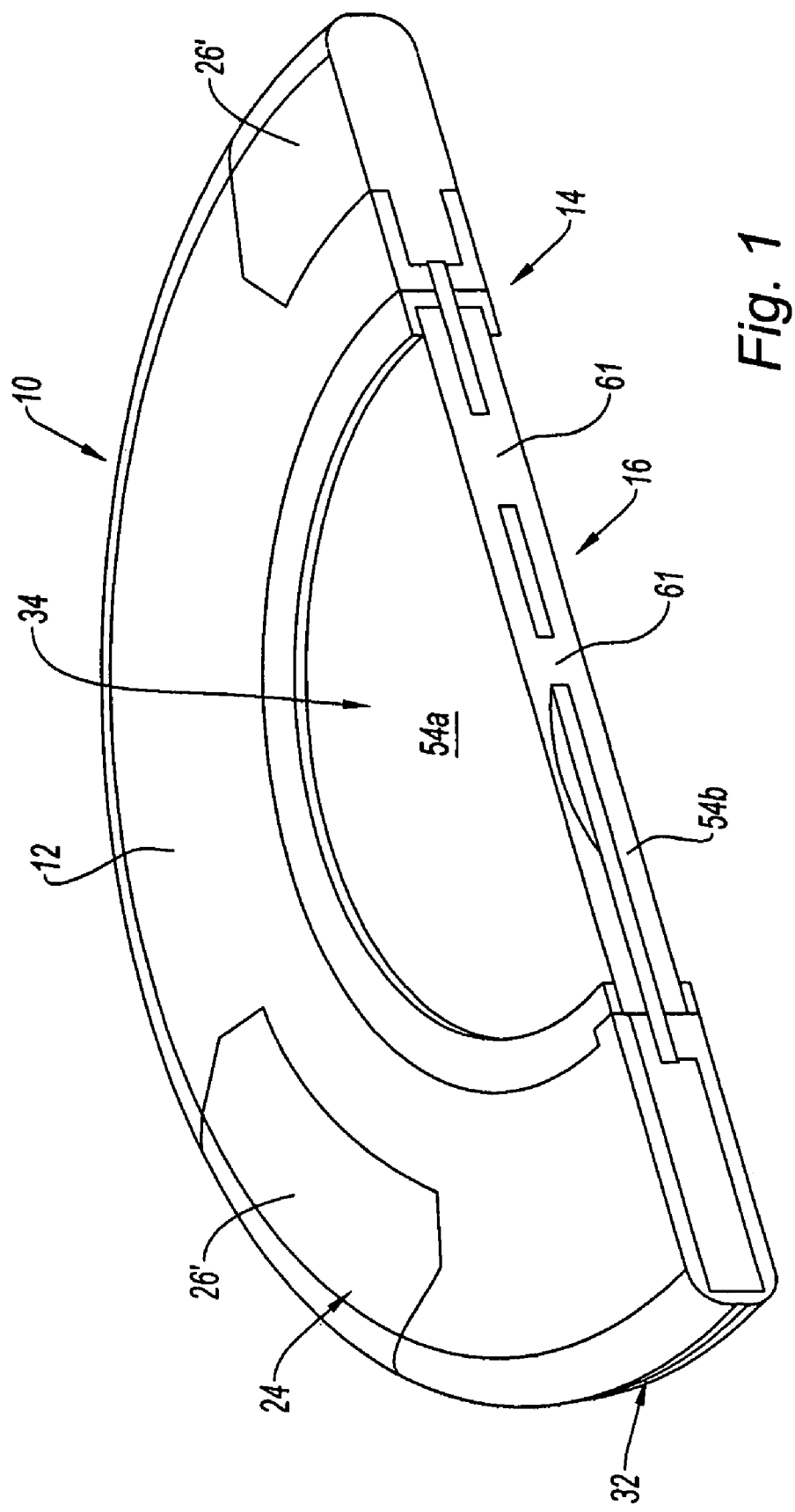
FIG. 1 represents a token according to the invention in perspective and in section.

In a first embodiment of the invention, a gaming chip 10, shown in FIG. 1, is in this instance in the form of a colored plastic material disk. The chip 10 includes a core 14 covered by a coating 12 and enclosing an insert 16.

Figure 3:
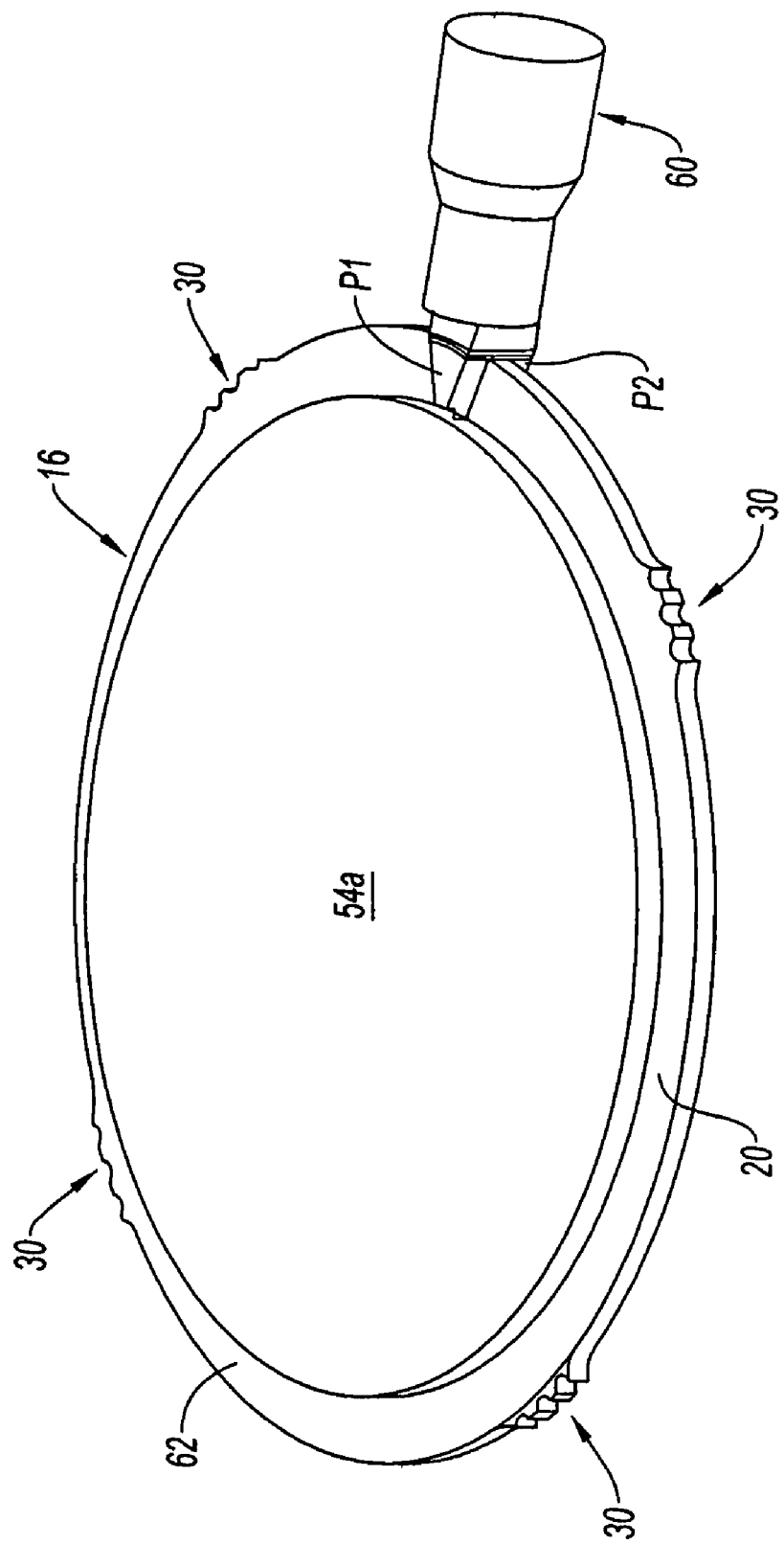
FIG. 3 represents an insert of a token according to the invention in perspective.

The insert 16 is represented in FIG. 3 in particular, which is referred to next.

The insert 16 includes a rigid plate 20 and two layers 54*a* and 54*b* of plastic material that partly cover the two faces of the rigid plate 20. The two layers 54*a* and 54*b* are produced by double injection of plastic material on both sides of the rigid plate 20.

The rigid plate 20 is produced in the form of an epoxy resin disk and has two faces. A contactless electronic microchip identification device 18 (FIG. 2) is attached to one of the faces.

FIG. 3 shows in particular the insert 16 just after extraction from the mold, showing a plastic material sprue 60 attached to the layers 54*a* and 54*b* and resulting from the injection of plastic material via two injection points P1 and P2, respectively, said sprue 60 being connected to said insert 16.

Figure 2:
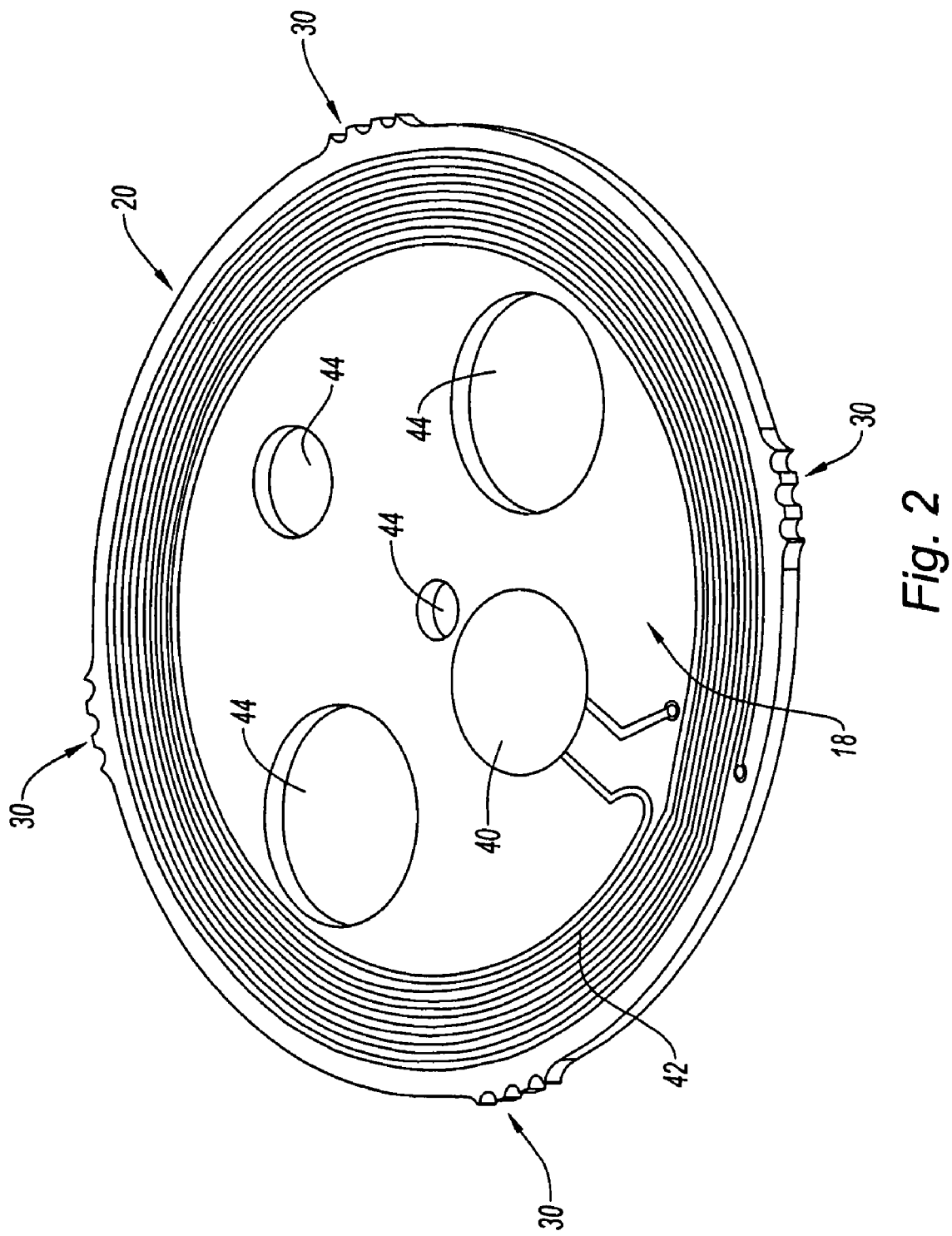
FIG. 2 represents a rigid plate featuring a contactless identification device in perspective.

FIG. 2 shows only the rigid plate 20 featuring the electronic microchip contactless identification device 18. This contactless identification device 18 includes an electronic circuit (or electronic microchip) 40 incorporating a PROM containing information concerning the chip and/or the person or the object associated with the chip, for example a fixed numerical or alphanumerical identification code on 64 bits (including one or more fields such as: the serial number, the identification of a product, a batch or a place, a numerical value associated with the chip, etc., and an RFID radio-frequency transceiver with a peripheral circular antenna 42 adapted to be fed by inductive coupling of modulated waves from a reading station (not shown).

In practice, the transceiver can exchange without contact by modulated waves data with a reading station placed at a distance (by way of non-limiting example from 15 cm to 2 m), the operating frequency being from 10 kHz to 20 MHz.

The memory electronic device combats theft, for example and/or facilitates the management and the inventory of a batch of objects in a defined space (storage areas, warehouses, stores).

Of course, without departing from the scope of the invention, the non-reprogrammable (read-only) type memory electronic identification device can be replaced by a reprogrammable device with code that can evolve, with the possibility of reading and writing in the memory.

The electronic circuit 40 is fastened to the rigid epoxy resin plate 20 and is covered with a layer of resin or other protective varnish. This protective varnish layer can cover the whole of the electronic circuit 40 and can equally extend over the whole of the surface of the rigid plate 20 so as also to protect the antenna 42.

The antenna 42 is produced on the rigid plate 20 by standard printed circuit fabrication methods to prevent all risk of the antenna 42 being torn off during at least the first molding operation carried out to obtain the insert 16.

According to the invention, the rigid plate 20 includes at least one—in this instance four—through-holes 44. When the plastic material is injected on both sides of the plate, the material extends through these holes 44 to form bridges 61 fastening the layers 54a and 54b together through the plate 20.

Because of this, the fastening of the insert 16 into the chip is more robust than in the case of the inserts of chips of types known in the art.

Because of the presence of the bridges 61, it is impossible to extract the plate 20 and therefore the identification device 18 without destroying the insert 16 of the chip.

The through-holes 44 are preferably far apart, to create connecting bridges 60 distributed over approximately all the surface of the plate.

In particular, there is provision for making holes with different diameters. The greater the diameter of the hole the better the layers 54 and the plate 20 are fastened together in the vicinity of the bridge 61 formed through the hole 44.

In the case of the embodiment shown in FIG. 2, the holes have different diameters according to their location on the plate, the holes produced in the vicinity of an electronic component like the microchip or the antenna having a smaller diameter than the others, to avoid damaging the microchip or the antenna when they are produced.

The rigidity of the plate enables the drilling of these holes. Furthermore, because the precise position of the microchip 40 and the antenna 42 on the plate are known, it is possible to produce the holes accurately without damaging either the microchip or the antenna.

Moreover, this accuracy in the production of the plate also enables a second antenna to be formed on the face opposite to that carrying the microchip and the antenna 42. The second antenna has not been shown to clarify the figures. It is an antenna that can take the form of a cross having the function of triggering an alarm if the chip is removed from a predefined geographical area, for example a room in a casino. Such antennas are found in particular in the "antitheft" type devices applied to the packaging of items in stores.

The two layers 54a and 54b preferably have a diameter less than that of the plate 20.

As shown in FIG. 3, this kind of implementation produces an edge 62 of the plate 20 projecting relative to the edge of the layers 54 between which the plate is sandwiched.

The projecting edge 62 has localized on its periphery a plurality of series of four teeth 30, the series of teeth 30 being symmetrically distributed about the axis of the insert 16.

The teeth 30 have in particular the function of placing the rigid plate correctly in a mold, through the introduction of the teeth 30 into cavities formed in the mold, or by matching the teeth up with complementary shapes formed in the mold, for example.

An injected plastic material peripheral ring 24 is fixed to this projecting edge 62 and to the series of teeth 30. The insert equipped with this kind of peripheral ring 24 constitutes a chip core. Two different embodiments of the core are shown in FIGS. 4 and 5.

Note in particular that the diameter of the layers produced by molding can vary according to the shape of the ring 24 produced, fitted around the insert.

Figure 4:
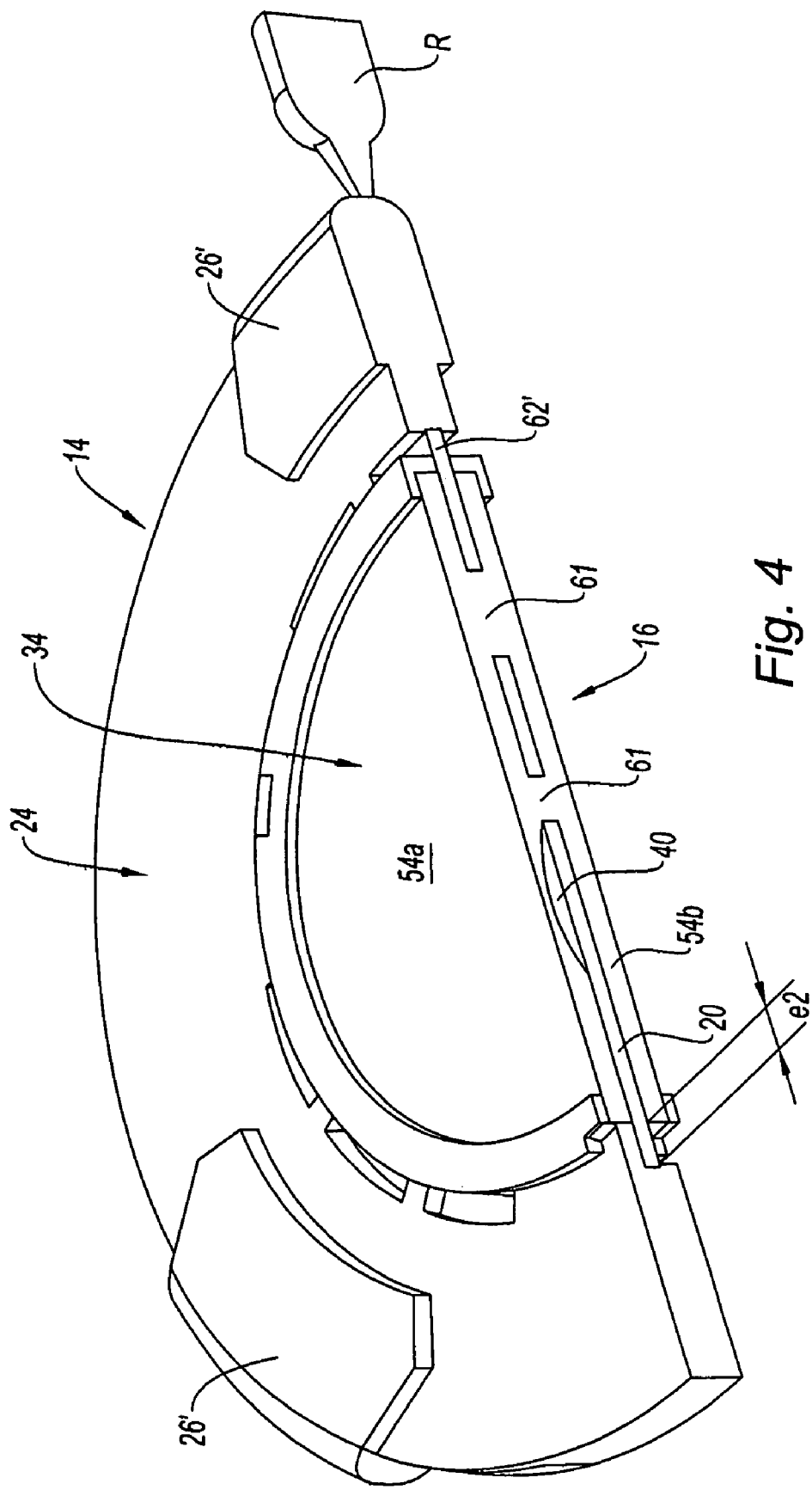
FIG. 4 represents a first embodiment of a token body molded over the insert from FIG. 3 in perspective and in section.
Figure 5:
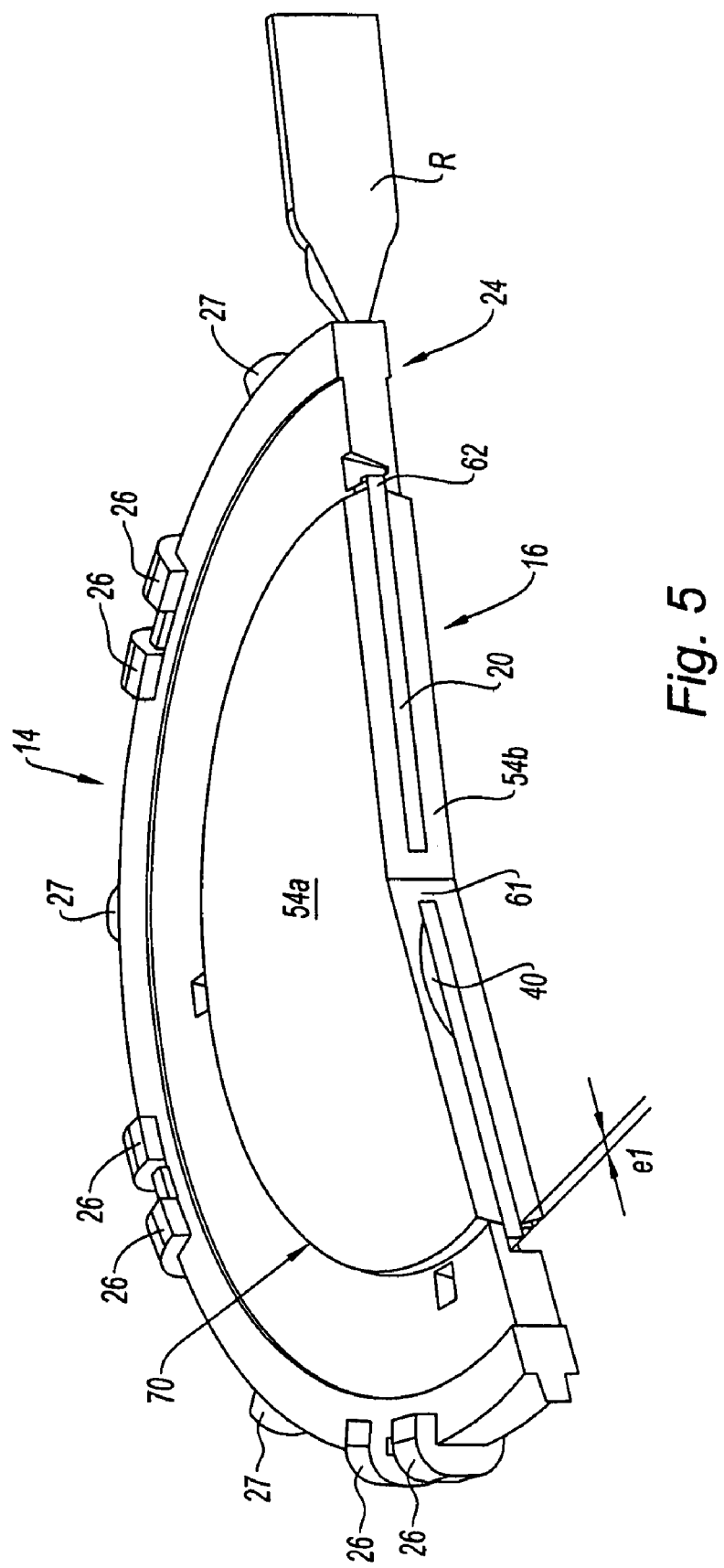
FIG. 5 represents a second embodiment of a token body molded over the insert from FIG. 3 in perspective and in section.

In particular, note in FIG. 5 that the thickness $e_1$ of the projecting edge 62 is less than that $e_2$ of the projecting edge 62' of the chip shown in FIG. 4.

The peripheral ring 24 is obtained by a second radial injection of plastic material relative to the insert 16 (radial injection is shown by the injection point R in FIGS. 1, 4 and 5), which material can be a different color from the plastic material from which the layers 54 are made.

In this instance, the ring 24 carries at its periphery projections 26, 26' and/or 27 extending radially and/or laterally that can be seen flush with the surface of the edge 32 of the chip 10 (FIG. 1).

In the embodiment shown in FIG. 5, the projections 26 are grouped in pairs to produce a two-color pattern of colored stripes.

The embodiment shown in FIG. 4 provides only one projection 26' wider than a projection 26.

It is therefore possible to produce, trapped in the mass of the body of the chip to resist counterfeiting, colored decorations of the faces and/or edges that can in particular be distinguished visually, and to associate these decorations or patterns of colored stripes with a coding of the chips as a function of their value, for example.

These patterns are conventionally repeated (for example 6 or 8 times) and equi-angularly distributed, in particular on the edge 32, to enable visual or optical identification of the chip regardless of its orientation.

Of course, the chip according to the invention need not feature edge patterns in the form of perpendicular stripes or patterns of stripes of color with two projections 26. The chip according to the invention may equally feature patterns including one to five projections. Nor is the invention limited to two-color chips, but equally concerns chips with one injection, three injections or even more.

The chip may equally be decorated by fixing into a shallow central cavity 34 on each face of the chip 10 a label carrying a decoration (for example a printed or screenprinted decoration) and/or a mark and/or a hologram. This kind of label has not been shown to simplify the figures.

In the embodiment shown in FIG. 5, the chip need not include any central cavity 34. In this embodiment, the ring 24 produces a shoulder 70 with the edge of a layer 54a of the insert, so that the layer 54a of the insert projects slightly relative to the surface of the ring 24 in the vicinity of the center of the chip. This produces a pattern different from that produced with the core represented in FIG. 4.

The execution of a method according to the invention is described next.

During injection of plastic material around the plate 20, the through-holes 44 formed in the rigid plate enable the insert, or at least a portion of the insert, of the chip to be produced by molding it over the identification device 18 in such a manner that the insert of the chip and the identification device 18 are fastened together.

Thanks to these through-holes 44, the plastic material injected to produce the overmolding of the identification device 18 is distributed, in the injection mold, on both sides of the rigid plate 20, the two layers 54 of plastic material being fastened to each other by bridges 61 through the through-holes 44 formed in the rigid plate 20.

The result of this first injection is thus a unitary structure, constituting the insert 16, including the rigid plate 20 supporting the contactless identification device 18 sandwiched between two layers 54a and 54b formed on respective opposite sides of the plate by the injected plastic material. This unitary structure makes extraction of the contactless identification device from the core of the chip impossible without destroying the insert of the chip.

The chip manufacturing process then continues with one or more injections (overmoldings) of annular covering layers 24 around the insert of the chip to form the core 14 of the chip and in particular any patterns on the edge of the chip, using known methods.

In the context of the embodiments shown, a final injection of plastic material is effected to produce a layer or covering 12 the surface level of which is flush with that of the projections 26, 26' and 27. The chip therefore has a surface and an edge that are totally smooth.

The chips of the invention preferably take the form of a disk with a diameter from 39 to 50 mm and with a thickness of the order of 3.3 mm. The edge of the chip can be chamfered with rounded edges or simply with a right-angle profile, especially if it is wished to be able to effect optical reading from the edge of the chips. If necessary, the chamfered or right-angle profile is completed by trimming with a grinding machine or on a lathe.

The center of the central portion of the core 14 furthermore includes on each face a central cavity 34 (FIGS. 1 and 4). These cavities 34 correspond to two facing projections provided on the internal faces of the half-shells of the mold to serve as abutments (with a small clearance) for the electronic identifier insert 16 during injection of the peripheral ring. These projections avoid deformation and/or damage to the insert 16 at the same time as preventing the risk of crushing the electronic circuit.

The body of the chip may be made from colored plastic materials, of different colors or not, obtained from at least one basic polymer chosen from the following:
 polymethyl methacrylate (PMMA);
 acrylonitrile-butadiene-styrene (ABS);
 polyamides and their copolymers;
 polyacetal and acetal copolymers (POM/polyoxymethylene);
 phenylene polysulfide (PPS);
 poly(alkylene terephthalate), in particular polybutylene terephthalate (PBT);
 thermoplastic polyurethanes (PUR);
 vinyl polymers, polyvinyl chloride (PVC);
 polyolefins, in particular polyethylenes (PE) and polypropylenes.

In a variant of the method of manufacturing a chip according to the invention, the material injected during the first injection, directly around the rigid plate 20, is a dense plastic material producing a ballast attached to the plate. This dense plastic material is a material charged with particles of tungsten, for example, which has a specific gravity of 4.7, 7 or 10. Thus a chip is advantageously obtained that has the weight required by croupiers, generally from 11 to 14 g.

Of course, the invention is not limited to the embodiments described and numerous variants are possible without departing from the scope of the invention.

The invention claimed is:

1. A token including an insert, said insert comprising:
 a one-piece rigid plate having a first face and a second face; and
 a contactless identification device attached to said first face of said one-piece rigid plate and two protection layers obtained by injection of material, covering at least partially said first face of said one-piece rigid plate and the second face of said one-piece rigid plate, wherein said one-piece rigid plate includes at least one through-hole such that said layers are fastened together through said one-piece rigid plate by at least one bridge of material passing through said at least one through-hole and obtained by said injection of material.

2. The token of claim 1, wherein said plate includes at least two through-holes distributed around the center of said plate.

3. The token of claim 1, wherein said contactless identification device further comprises an electronic microchip connected to an antenna formed on the rigid plate, said microchip and said antenna being fastened to said plate.

4. The token of claim 3, wherein said electronic microchip has a protective varnish cover.

5. The token of claim 3, wherein said antenna is in the form of a winding at the periphery of the rigid plate.

6. The token of claim 1, wherein said injected material of the protection layers is more dense than the material of a remaining portion of the token so as to constitute a ballast.

7. The token of claim 6, wherein said more dense material is a plastic material charged with tungsten powder.

8. The token of claim 1, said insert further comprising at least one supplementary layer of material produced by supplementary injection of material at least partially around said insert.

9. A method of manufacturing the token of claim 1, comprising:
 making at least one injection of material around said one-piece rigid plate said first face of which comprises said contactless identification device, said one-piece rigid plate including at least one through-hole, said method further comprising:
 placing said one-piece rigid plate in a mold;
 making a first injection of a material onto said first face of said one-piece rigid plate and onto said second face of said one-piece rigid plate to form, on each of said faces on both sides of said one-piece rigid plate, a layer of material, said layers being fastened together by at least one bridge formed by the injected material passing through said at least one hole, the resulting assembly constituting an insert; and
 making at least one supplementary injection of plastic material around said insert.

10. A method of manufacturing a token including an insert, said method comprising:
 making at least one injection of material around a one-piece rigid plate having a first face and a second face, said first face of which comprises a contactless identification device, said one-piece plate including at least one through-hole;
 placing said one-piece rigid plate in a mold;
 making a first injection of a material onto said first face of said one-piece rigid plate and onto the second face of said one-piece rigid plate to form, on each of said faces on both sides of said one-piece rigid plate, a layer of material, said layers being fastened together by at least one bridge formed by the injected material passing through said at least one hole, the resulting assembly constituting said insert; and making at least one supplementary injection of plastic material around said insert.

11. The method of claim 10, wherein the material injected around said plate during the first injection is a plastic material more dense than that utilized for said supplementary injection.

12. The method of claim 11 wherein said more dense plastic material is a plastic material charged with tungsten powder.

13. The method of claim 10 wherein said plate includes at least two through-holes distributed around the center of said plate.

14. The method of claim 10, further comprising connecting an electronic microchip to an antenna formed on the rigid plate, and fastening said microchip and said antenna to said plate.

15. The method of claim 14, further comprising covering said electronic microchip with a protective varnish.

16. The method of claim 14, further comprising producing said antenna in the form of a winding at the periphery of the rigid plate.

17. A token formed by the method of claim 10.

18. An apparatus for manufacturing a token that includes an insert obtained by at least one injection of material around a one-piece rigid plate, a first face of which includes a contactless identification device, said one-piece rigid plate including at least one through-hole, said apparatus comprising:

a) at least one of, a device and mechanism for placing said one-piece rigid plate in a mold;
b) at least one of, a device and mechanism for making a first injection of a material onto said first face of said one-piece rigid plate and onto a second face of said one-piece rigid plate to form, on each of said faces on both sides of said plate, a layer of material, said layers being fastened together by at least one bridge formed by the injected material passing through said at least one hole, the resulting assembly constituting said insert; and
c) at least one of, a device and mechanism for making a supplementary injection of plastic material around said insert.

19. A token formed by the apparatus of claim 18.

* * * * *